(12) United States Patent
Pare (10) Patent No.: US 8,887,072 B2
(45) Date of Patent: Nov. 11, 2014

(54) METHOD OF MANAGING A SET OF VIRTUAL ENVIRONMENT CONTROL ENTITIES, DEVICE, AND CORRESPONDING COMPUTER PROGRAM PRODUCT

(75) Inventor: Louis Pare, Paris (FR)

(73) Assignee: Orange, Paris (FR)

( * ) Notice: Subject to any disclaimer, the term of this patent is extended or adjusted under 35 U.S.C. 154(b) by 502 days.

(21) Appl. No.: 12/746,048

(22) PCT Filed: Dec. 5, 2008

(86) PCT No.: PCT/FR2008/052213
§ 371 (c)(1),
(2), (4) Date: Aug. 6, 2010

(87) PCT Pub. No.: WO2009/080946
PCT Pub. Date: Jul. 2, 2009

(65) Prior Publication Data
US 2010/0299618 A1 Nov. 25, 2010

(30) Foreign Application Priority Data
Dec. 7, 2007 (FR) ...................................... 07 59658

(51) Int. Cl.
*G06F 3/048* (2013.01)
*G06F 19/00* (2011.01)
*G06N 3/00* (2006.01)

(52) U.S. Cl.
CPC ...................................... *G06N 3/006* (2013.01)
USPC ....................................................... 715/757

(58) Field of Classification Search
USPC ......................................................... 715/757
See application file for complete search history.

(56) References Cited

U.S. PATENT DOCUMENTS

| 2002/0116458 | A1* | 8/2002 | Bricklin et al. ................ 709/204 |
| 2005/0015725 | A1* | 1/2005 | Matsuda ........................ 715/706 |
| 2007/0226744 | A1* | 9/2007 | Callaway et al. .............. 718/105 |
| 2007/0276709 | A1* | 11/2007 | Trimby et al. .................... 705/6 |

OTHER PUBLICATIONS

French Search Report dated Nov. 20, 2008 for corresponding French Application No. FR 0759658, filed Dec. 7, 2007.
International Preliminary Report on Patentability and Written Opinion of the International Searching Authority for corresponding International Application No. PCT/FR2008/052213, filed Dec. 5, 2008.
International Search Report dated Jul. 6, 2009 for corresponding International Application No. PCT/FR2008/052213, filed Dec. 5, 2008.

* cited by examiner

*Primary Examiner* — Peiyong Weng
(74) *Attorney, Agent, or Firm* — David D. Brush; Westman, Champlin & Koehler, P.A.

(57) ABSTRACT

A method is provided for managing a set of entities, each controlling a virtual environment in which user representations evolve. The method includes the following steps: monitoring at least one characteristic of each of the entities and/or at least one characteristic of a corresponding virtual environment; proposing to transfer and/or transferring at least one of the user representations from a first virtual environment to a second virtual environment, as a function of the characteristic or characteristics monitored.

8 Claims, 5 Drawing Sheets

METHOD OF MANAGING A SET OF VIRTUAL ENVIRONMENT CONTROL ENTITIES, DEVICE, AND CORRESPONDING COMPUTER PROGRAM PRODUCT

CROSS-REFERENCE TO RELATED APPLICATIONS

This Application is a Section 371 National Stage Application of International Application No. PCT/FR2008/052213, filed Dec. 5, 2008 and published as WO 2009/080946 on Jul. 2, 2009, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The present disclosure pertains to the information-processing related management of virtual environments such as "virtual worlds", for example enabling users to meet one another virtually through their respective terminals. More specifically, the invention pertains to the management of a set of entities (servers or software programs) each managing one of these environments or virtual worlds in an information-processing system for managing virtual worlds.

Here below in this document, the notions of environments and virtual worlds shall be used equally, without in any way affecting the understanding of the disclosure.

A virtual environment can be seen as a representation of a particular universe in which users from the real world are present in the form of avatars. An avatar is a representation of a user made by means of a set of parameters. Such a representation can take the form of an image or of an animated object.

Thus, within a virtual world known as an "immersive" world, such a representation generally corresponds to the result of computations, sometimes complex ones, performed on the basis of various parameters proper to a user. Such a representation may be 2D or 3D and may progress in real time, both according to parameters and/or actions performed by the user in the virtual world and according to actions performed by other users (or their respective avatars) acting within a same virtual world. A virtual world is said to be immersive when the user is plunged into this world by means of a representation of a space and of users, for example in three dimensions. The term used then is "user immersion".

BACKGROUND OF THE DISCLOSURE

In a virtual world, encounters between avatars enable interlocutors represented by these avatars to exchange information with one another. When a virtual world is successful, a set of problems and issues arise, related to the numbers of participants generated by the attraction that users have to this virtual world.

From a technical viewpoint the resources needed for managing all the avatars of a virtual world cannot be indefinitely extended. Indeed, to implement a virtual world, a set of resources must be available. These are especially information technology resources (such as servers or network means) available to a service provider. The main task of such information technology servers is to pass on the changes undergone by each avatar to the other avatars present in the same virtual world that they share. When the number of avatars present in a virtual world increases, the server (or the group of servers) managing this world must manage such changes, most usually linearly, and sometimes exponentially in terms of load increases or more generally load variations.

From the viewpoint of a user connected to the virtual world, displaying all the avatars present may therefore raise problems of load management even when the number of these avatars increases appreciably especially for low-power terminals. Indeed, in the general mechanisms for managing virtual worlds, resources are often used within customer stations (i.e. stations of the users of the virtual world) to compute and display scenes (using specific languages such as the VRML (or Virtual Reality Modeling Language). Such computations consume power at the user terminals (involving the use of one or more microprocessors, virtual memory etc).

The existence of a large number of avatars also poses a direct problem to the user who then has difficulty in apprehending all the avatars present in his environment. For example, in the case of a virtual world designed to encourage meetings with other people in the virtual world who are using avatars, the presence of a thousand avatars risks being counter-productive (just as it would be difficult to set up a meeting in a crowd of a thousand individuals).

A commonly accepted limit today in the management of avatars within a virtual world is about 100 avatars simultaneously hosted on a "low-range" hardware server. This limit is soon reached in virtual worlds put online on the Internet, or even greatly exceeded with up to several thousands of simultaneous users for popular online sites.

There are techniques for circumventing these limits by building several virtual worlds which are then supported on one or more different server apparatuses. In the case of a server apparatus controlling several virtual worlds, it is possible to distinguish several entities in this server, called management or control entities, each dedicated to the management of one virtual world. It then becomes possible to identify a control entity on a server apparatus with a specific virtual world. In such an architecture, each terminal of a user of one of these specific worlds then needs to display only the avatars of the users that are connected to its world and enter their field of vision. Furthermore, each control entity on a server apparatus needs to have only the resources necessary for managing a subset of the users (i.e. the users of a specific world). However, the virtual worlds are in actual fact sealed off from each other.

One problem of this prior-art technique therefore lies in the way in which the changing of worlds is managed from the viewpoint of the users and from the viewpoint of the control entities on the servers. Indeed, this architecture obligatorily causes a compartmentalized separation between the worlds. To overcome this separation, service providers build several virtual worlds connected by passages, often called gates or portals, that are visible in varying degrees.

The problem then, at the technical level, is that of synchronizing the "gates" between the worlds and, at the economic level, that of the cost of achieving the visual aspect of each of these worlds. This approach however has the advantage of transparency for the customer but at high cost and lengthy implementation of the extensions of server apparatuses involving additional servers.

Other service providers economize on the cost of the visual aspect of the worlds by using the same visual aspect each time but with total separation between the different clone worlds. The user must thus choose the world to which he will be going prior to immersion. When he wishes to meet avatars from other worlds, he must change worlds. This approach has the advantage of low cost and fast implementation of extensions for server apparatuses but entails much inconvenience to the user, making his overall appreciation and experience of the service a negative one.

Indeed, the user is unable, within a same world, to meet all the avatars whom he might know and with whom he may have affinities. The user is therefore required to change worlds to meet other avatars. He must therefore manually disconnect from the current virtual world and then reconnect to another virtual world, which is not very practical and hampers the use of such services.

Furthermore, these different approaches in no way resolve the problem of the load of the control entities in the servers since the user can always choose to penetrate a virtual world as an extra load. It is furthermore this choice that he will most usually be making, identifying load with the success or efficiency of the virtual world.

Another drawback of these approaches is that imbalances may appear in these different virtual worlds, (for example between the number of women and the number of men in the case of a dating site) and if all the virtual worlds are identical in terms of construction, a user will not know in principle which virtual world will be most suited to his expectations.

SUMMARY

An aspect of the present disclosure relates to a method for managing a set of entities each controlling a virtual environment in which user representations are acting.

According to an embodiment of the invention, such a method comprises the following steps:
  monitoring at least one characteristic of each said entities and/or at least one characteristic of the corresponding virtual environment;
  proposing to transfer and/or transferring at least one of said user representations from a first virtual environment to a second virtual environment, according to said monitored characteristic or characteristics.

An entity for controlling a virtual environment can for example be a server or an instance of a control program for a virtual environment (or world) notably when a same server controls several virtual environments.

According to an embodiment of the invention, it is the device for managing virtual environments (classically a managing server) that proposes transfers and/or makes them. It is therefore not the user who, on his own initiative, decides to change his world (even if such a possibility can be provided for).

The proposal for transfer made by the management device is not random but takes account of objective technical characteristics (the load of the server for example) or characteristics representing the state of the virtual world considered (number and/or typology of representations).

This approach, implemented by the managing device, can also make it possible in certain embodiments to objectively optimize the chances of success (for example the chances of meeting a person being sought) for each user.

According to one particular embodiment of the invention, the method comprises, prior to said step for proposing a transfer and/or for transferring, a step for controlling a possibility of transferring said at least one representation of a user to said second virtual environment.

In particular, said step for controlling comprises the following sub-steps:
  detecting the existence of a communication engaged between said user representation and at least one other user representation;
  authorizing said step for proposing a transfer and/or for transferring if said detection is negative.

Thus, the method of an embodiment of the invention prevents a representation of the user from being transferred to a virtual environment at the very time that this user is not available for doing this. Thus, for example, if a user enters into communication with another user through his representation, he is not moved into the destination virtual environment. Thus, an embodiment of the invention makes it possible to comply with actions that are performed by the user's avatar.

According to one particular characteristic, said step for transferring and/or for proposing a transfer comprises the following sub-steps:
  making a proposal to said user to transfer his representation from said first virtual environment to said second virtual environment;
  processing a response received from said user following said sub-step of making a proposal so as to determine his assent to or his refusal of a transfer of his representation;
  in the event of assent by said user, transferring the representation of said user from said first virtual environment to said second virtual environment.

Thus, an embodiment of the invention makes it possible to subordinate the transfer to assent by the user. The user thus has a right to review his transfer. He can refuse this transfer and remain in the virtual environment in which he is located. Such a case may occur for example when the user wishes to meet another user's avatar at a determined time and does not wish to change his location.

According to one particular aspect of an embodiment of the invention, the monitoring step comprises the following sub-steps:
  obtaining at least one piece of information representing a characteristic of said user, called a piece of user data;
  comparing said piece or pieces of user data with the corresponding data of at least one other user present in each of the virtual environments;
  selecting said second virtual environment in which a transfer must be made according to the results of said comparison.

In particular, said step for comparing implements a computation of a distance between said piece or pieces of user data to determine, in each of said environments, at least one set of user representations that are proximate, according to said distance, to the representation of the user to be transferred and said step for selecting selects a virtual environment in which said set or sets determined at the comparison step comprise the largest number of representations.

Thus, an embodiment of the invention makes it possible to take account of the user's characteristics during the identification of a virtual destination environment. Such taking into account of the user thus enables the transfer of the user to an environment that suits him. Indeed, the load balancing achieved by the method of an embodiment of the invention then furthermore provides satisfaction to the user since his characteristics are taken into account.

One characteristic taken into account may be for example the age, sex, or height either of the user as such or of a person whom this user wishes to meet. This list of characteristics is of course not restrictive and may include any characteristic that can be defined for a user.

The selection of a virtual destination environment is then achieved by taking account of the population contained in this virtual environment, namely all the characteristics of other users which best correspond to the characteristics of the user to be transferred.

In one particular embodiment of the invention, said monitoring step comprises a sub-step for checking the distribution of the user representations in each of said virtual environments according to at least one predetermined distribution parameter.

For example, said predetermined distribution parameter belongs to the group comprising at least:
- a number of user representations per virtual environment;
- a parameter representing a predefined distribution in terms of number of representations between at least two groups of users each having at least one similar characteristic;
- a parameter for distributing load of at least one entity for managing at least one virtual environment.

Thus, an embodiment of the invention can be used to adjust the load of the servers implementing the virtual environments while at the same time complying with the parameters of distribution of the representations of these users within virtual environments in which they are transferred.

These distribution parameters are used to obtain a deterministic distribution because a deterministic algorithm is implemented jointly with these parameters. Thus, the implementing of such a deterministic algorithm makes it possible to obtain a homogenous distribution of the representations which also provide for a balancing of the load of the servers.

One distribution parameter may be for example: at most 200 representations simultaneously in the virtual environment and/or an equal distribution of men and women and/or a Gaussian distribution of the representations according to the height of the users to which the representations belong and/or a uniform distribution of the representations according to the hair color of the users to which the representations belong and/or a load of 50% of machine power consumption on the server in nominal mode, etc.

In particular, said monitored characteristics belong to the group comprising at least:
- one piece of information representing consumption of a resource, by said entity, that is above a determined ceiling;
- one piece of information representing consumption of a resource, by said entity, that is below a determined threshold;
- a number of user representations below a determined threshold in said first virtual environment;
- a number of user representations above a determined threshold in said first virtual environment;
- a periodically programmed activation moment;
- a randomly programmed activation moment.

Thus, an embodiment of the invention makes the occurrence of a transfer of a user conditional upon a particular event. An embodiment of the invention therefore does not allow incessant transfers of a user, thus ensuring optimum quality of service for the user. The user can thus be transferred for example when the server that is hosting the virtual environment in which his representation has reached a determined resource consumption ceiling (for example consumption in terms of server memory, bandwidth for inter-server exchanges, a load of a microprocessor on the server etc) which may lead to poor quality of service (because the interaction with this virtual environment then becomes slower) or when, on the contrary, a resource consumption threshold on the server is reached or yet again when, during a procedure for continuous updating, an instant for activating the transfer is programmed for the representation of the user.

An embodiment of the invention also pertains to a device for managing a set of entities each controlling a virtual environment in which representations of a user are acting.

According to an embodiment of the invention, such a device comprises:
- means for monitoring at least one characteristic of each said entities and/or at least one characteristic of said corresponding virtual environment;
- means for proposing to transfer and/or for transferring at least one of said user representations from a first virtual environment to a second virtual environment, according to said monitored characteristic or characteristics.

Such a device is capable notably of implementing the method of management described here above. It may be for example a central server providing for the management of the servers or entities on servers hosting one or more virtual environments as described here above. It may also be a server hosting one or more virtual environments and also providing for the management of the other servers hosting other virtual environments.

An embodiment of the invention also pertains to a computer program product downloadable from a communications network and/or recorded on a computer-readable carrier and/or executable by a microprocessor, comprising program code instructions for executing the method for managing as described here above.

BRIEF DESCRIPTION OF THE DRAWINGS

Other features and advantages shall appear more clearly in the following description of a preferred embodiment given by way of a simple illustrative and non-exhaustive example, and from the appended drawings, of which.

DETAILED DESCRIPTION OF ILLUSTRATIVE EMBODIMENTS

1. Reminder of the Principle of an Embodiment of the Invention

An embodiment of the invention can be used to optimize the management of the servers or control entities on servers that support the implementing of virtual worlds in terms of load and/or response to users' expectations, by proposing transfers of according to one or more characteristics monitored by a management device.

Thus, unlike the total separation mechanism of the prior art in which the user must himself or herself change virtual worlds manually, an embodiment of the invention proposes a transfer and/or transfers user representations into a virtual destination world according to a monitoring of characteristics of the servers or control entities on servers controlling the virtual worlds and/or characteristics of the virtual worlds themselves without any preliminary search or action on the part of the user.

At the level of the control entities on the servers, the characteristics monitored may be for example the load, the consumption of one or more resources etc.

At the level of the virtual worlds, the monitored characteristics may for example be a distribution of avatars within each monitored world such as for example 200 avatars or more simultaneously in a same virtual world, an equal distribution of men and women, a Gaussian or uniform distribution of the avatars according to characteristics such as height, hair color of the users represented etc.

The characteristics monitored may also correspond to a computation of distance between the characteristics of the different users, if necessary with adapted weighting, so as to distribute the users in order to place them in the best of all worlds that most corresponds in principle and objectively to their expectations, for example a world in which they have the greatest chance of meeting other users who correspond to them while the distribution of the load of each control entity or of each server is optimized.

The implementation of an embodiment of the invention therefore presupposes the presence of a plurality of (at least two) virtual worlds. These virtual worlds can be identical (or similar) in terms of environment but different of course in terms of the avatars present in each of them. In other embodiments, they may also be different in terms of environment.

The transfer of a representation of a user or avatar from a first virtual world to a second virtual world (destination world) makes it possible, in at least certain embodiments, to ensure that the load of the server or of the control entity on the server will be regulated because there is a strong relationship between the number of user representations in the world and the load of the server or of the control entity on the server hosting this world. The more representations there are, the greater the load and vice versa. An embodiment of the invention makes it possible, in certain embodiments, to regulate the load by distributing the representations of the users connected to the virtual worlds in an optimized way, according to a predetermined algorithm, so that these representations are no longer placed automatically in virtual worlds that do not suit them.

According to another aspect, an embodiment of the invention makes it possible to propose to a user, at any time, or at predetermined times (and not only the time of entry into the virtual worlds) a transfer to a virtual world which in principle would best correspond to him.

The implementation of an embodiment of the invention relies on at least certain of the following technical aspects, depending on the embodiments:
- the permanent or periodic monitoring of the state of the different virtual worlds;
- the occurrence of an event initiating a transfer;
- a search for a virtual destination world according to this event, enabling the identification of a virtual world into which the representation of the user will be transferred;
- checking that the destination world identified is capable of receiving the representation of the user;
- effectively transferring the user's representation to decrease the load of the server or of the control entity on the server that hosts the virtual world from which this representation has come.

In other words, the proposed solution consists especially of a method for managing control entities on servers each associated with a virtual world, providing for a distribution or a proposal for distribution of representations of the users on control entities reproducing the same virtual world. The method of an embodiment of the invention is implemented at any time, or at given points in time with a proposal for a new distribution of the representations of the users within virtual worlds. The representations of the users change or do not change their control entity, depending on the result of computation of distribution.

The time at which the method is implemented may depend on an event occurring in the real world (such as an overload on a server, an increase or decrease in populations in a given world etc.).

Such an event may be for example:
- an occurrence of an overload of a server apparatus or a control entity on a server, namely a time at which a predefined threshold or ceiling of consumption of a resource is reached. The general load of an apparatus may be the result of a computation of consumption of at least one of the resources of the apparatus. For example: when the processor time consumed reaches 80% or the network bit rate is greater than 600 kbits/s and the number of packets transmitted is greater than 10,000 p/s.
- an occurrence of a result of a computation on a number of user representations or the number of a particular type of user representations in the virtual world. When this result reaches a predefined threshold or ceiling, the transfer can be made. For example, when there are more than 200 representations of "male" users and more than 200 representations of "female" users, the method is implemented to transfer user representations in excess or to obtain a new overall distribution of all the user representations of this virtual world. Taking such an event into account makes it possible to control the peaks of load prior to their occurrence and to balance the distribution of the representations between the virtual worlds.

A permanent monitoring of the different virtual worlds can also be implemented, for example to offer a user a transfer to another virtual world which seems to be more adapted at the instant considered (i.e. depending on the users present in the world at this instant).

The method can be implemented for all the representations of all the users of all the virtual worlds at a given point in time, thus prompting a general distribution of the load on all the servers or on all the control entities on the servers.

The method of an embodiment of the invention can also be implemented by going with the flow, i.e. throughout the lifetime of the virtual worlds, in order to regulate the load continuously and/or optimize the user's satisfaction.

The destination world of the user's representation can also be identified in several different ways:
- at random: a world will be identified at random and the user's representation will be transferred to it;
- according to a deterministic algorithm: for example in taking account of the number of users present in each world and in selecting the least populated world;
- in taking account of exchanges in progress between the user's representations: for example if a user's representation is communicating with another user's representation, either the transfer is not made or both these representations are transferred simultaneously;
- according to the user's characteristics: a virtual world corresponding to the user's characteristics is identified in order to transfer his or her representation into a suitable world. For example, for a football lover, the virtual destination world identified will be the one with the greatest number of football fans.

An embodiment of the invention also optimizes the operation as seen from the user's point of view, inasmuch as:

his or her transfer to the destination world is made automatically: this means that the user does not need to do anything about the transfer;

the servers are always ready to provide an optimum service. This means that the servers whose load is controlled by the method of an embodiment of the invention can respond without delay to the interactions between users' representations, thus making the experience of immersion in the virtual world more pleasant.

According to one particular characteristic of an embodiment of the invention, the transfer of the user's representation can also be made conditional upon his or her assent. Thus, for example, when a first user is in contact with a second user or is awaiting the arrival of the second user in a virtual world, this first user is not directly transferred to another world without his assent.

Thus, from the user's viewpoint, an embodiment of the invention enables the user to obtain the best possible matching of the virtual world to his needs and to conceal its technical limits. On the technical side, the management of the distribution of load of the servers has no impact on the immersion of the users.

The method of an embodiment of the invention can be applied to any virtual world (2D or 3D world) where the users' representations represent users from the real world. When the influx becomes too great, an embodiment of the invention limits the costs of setting up additional resources. An additional valuable feature of an embodiment of the invention lies in the increasing of possibilities of encounters offered to users.

Here below, we present especially the case of an implementation of the method of an embodiment of the invention in a system comprising a plurality of virtual worlds offering users the possibility of meeting and communicating. It is clear however that an embodiment of the invention is not restricted to this particular application but can also be implemented in many other fields where a balancing of loads and/or an optimizing of the distribution of the users is desirable.

2. Description of One Embodiment

Figure 1:
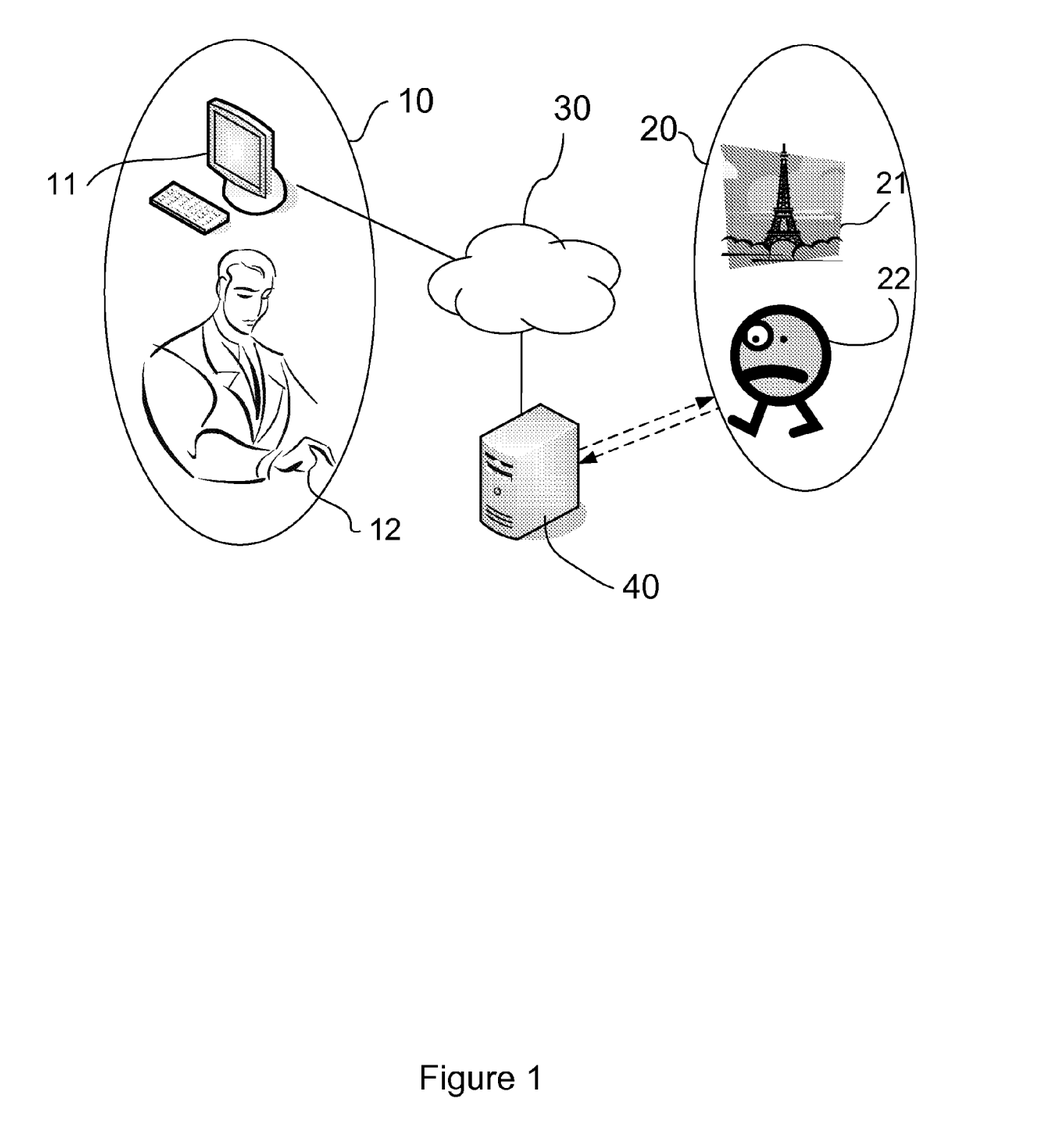
FIG. 1 illustrates an example of a general system for implementing the method of an embodiment of the invention.

Referring to FIG. 1, we present in this embodiment the general principle of implementation of the method of an embodiment of the invention.

In the real world 10, each user 12 accesses a virtual world 20 through an immersion terminal 11 (for example a computer but any other immersion system can of course be envisaged, for example a telephone, a PDA etc).

Each virtual world 20 comprises:
one or more virtual spaces 21;
users' representations or avatars 22 representing the users 12 of the real world.

Such a system also comprises:
a communications network 30 enabling the immersion terminals 11 to communicate with each other as well with servers 40;
servers or control entities on the servers 40 fulfilling a role of coordination, distribution and storage.

In the virtual world 20, a user 12 from the real world 10 is represented by his avatar 22. In the real world 10, the user 12 drives his user representation 22 and sees the visual field viewed by this avatar 22 by means of the immersion terminal 11.

In this embodiment, the method of the invention is implemented by using physical parameters of the real world. These parameters are of several types:

the parameters related to the support or host servers of the virtual worlds. These are concrete parameters related to a present situation or to a future situation concerning for example the load of the processing operations to be performed on the servers considered;

the parameters linked to the users having representations such as eye color, height, sex, areas of interest. These are characteristics previously entered by the users in order to define for example their respective appearance, tastes, preferences, expectations or occupations in the real world.

Figure 2:
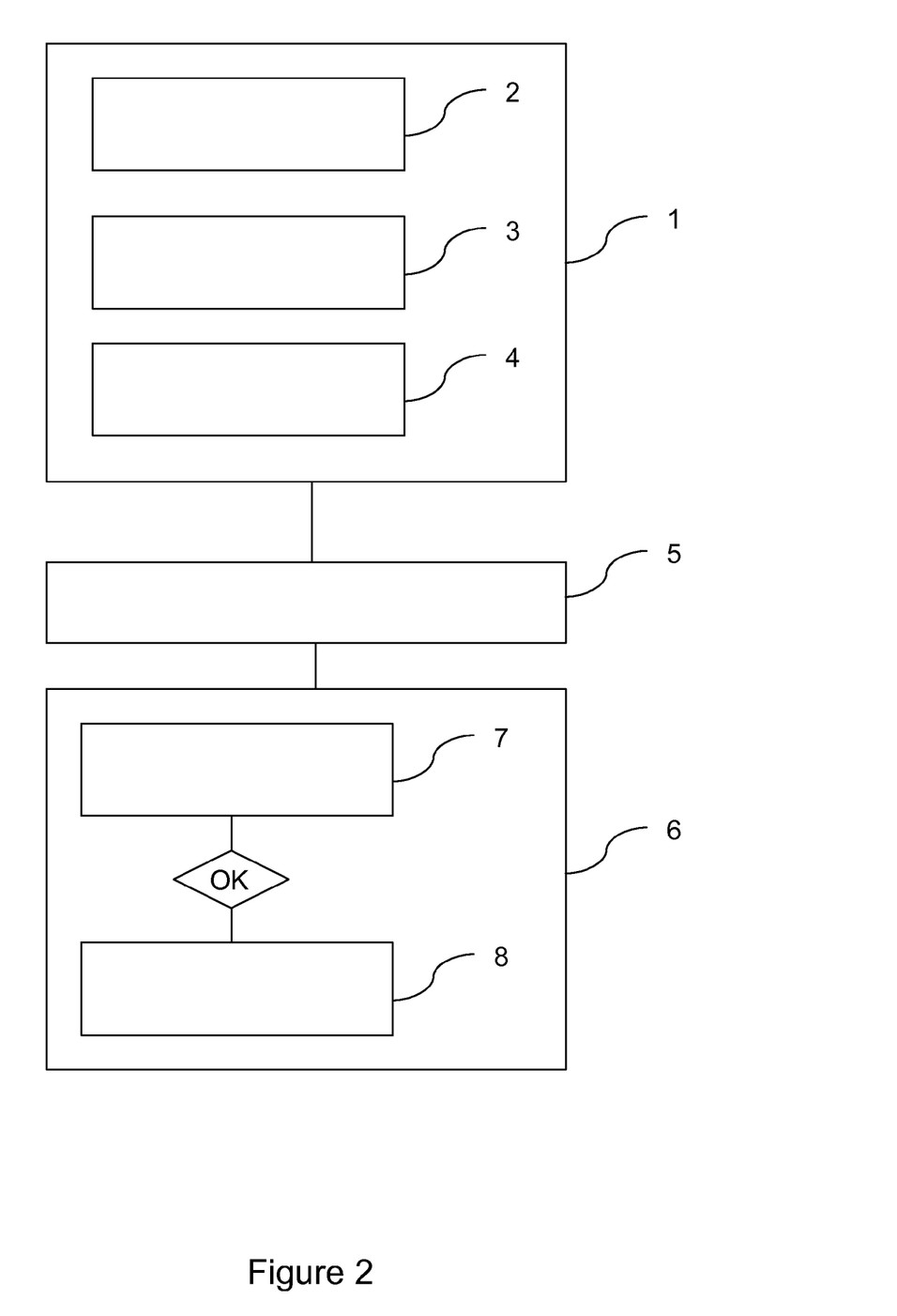
FIG. 2 presents the main steps of the method according to one embodiment of the invention in a system such as that shown in FIG. 1.

Referring now to FIG. 2, we present the main steps of the method according to an embodiment of the invention.

During a monitoring step 1, various characteristics are monitored in order to activate a transfer if one or more of these characteristics take a predetermined value or change in a particular way etc.

For example, it may be a monitoring 2 of the load of one or more servers controlling the different virtual worlds considered.

It may also be the monitoring 3 of the distinctive signs associated with the avatars previously described (for example the monitoring of the green spheres visible by a given avatar).

It may also be the monitoring of a particular distribution of avatars in each of the virtual worlds, for example the monitoring of equality between male avatars and female avatars.

These different characteristics are described in greater detail here below in the description.

This monitoring step 1 activates a search 5 for the best possible destination for the avatar concerned. Indeed, in this embodiment, the transfer of an avatar activated by the result of the monitoring step 1 is proposed so that the avatar gets placed in a virtual world most adapted to the one in which he was already. This step 5 of searching for a most appropriate destination is also described in greater detail here below. This search can furthermore take account of the results of the monitoring steps 2, 3 or 4.

Once the new best of all worlds has been identified, a transfer step 6 is implemented, comprising a sub-step for proposing a transfer 7 and, in the event of agreement, a sub-step for carrying out the transfer 8.

The transfer proposal can be submitted to the user of the avatar that is to be transferred for this user's assent. The transfer proposal can also be submitted to the entity managing the destination virtual world identified for verification of the load for example or of a criterion of distribution.

2.1 Representations of the Users

In this embodiment, the parameters related to the connected users 12 are taken into account through their systems 11.

Each user possesses a representation 22 such as an avatar within the virtual world 20. It may be a 3D representation which in this case is modeled and displayed by appropriate mechanisms implemented in a system 11 or a server 40. It can also be a 2D representation, for example in the form of a predetermined and pre-configured graphic file. The user 12 can also modify other characteristics which may or may not be integrated into his or her representation, for example appearance, taste and occupation etc.

The user 12 can also indicate one or more characteristics that he/she wishes to find among the users encountered through his/her representation 22 in the virtual world 20. The user 12 may also wish to network with football lovers or with individuals having particular physical characteristics.

Within the virtual world 20, the representations 22 of the users 12 may therefore be supplemented in order to bring out a degree of correspondence between the characteristics sought by a user and characteristics sought by another user whom he meets.

This degree of correspondence is displayed within the virtual world and in this embodiment by a distinctive sign or indicator associated with the user representations. For example, this distinctive sign may be a colored geometrical shape (an arc of a circle or a sphere) placed above an avatar's head. The color of this geometrical shape varies according to the degree of correspondence relative to the characteristics sought by the users. Thus, for example, a representation of a first user corresponding perfectly to the characteristics sought by a second user will have a green geometrical shape if the characteristics sought by this first user also correspond perfectly with those of the first user (i.e. if there is reciprocity). Other indicating means (luminosity, color, flashing lights etc) may of course be envisaged.

A user representation that does not correspond at all to the characteristics sought by another user will either possess no geometrical shape whatsoever or will possess a distinctive geometrical shape, for example colored black or red.

An intermediate color (orange for example) could be presented if only certain criteria are met (for example a sharing of certain areas of interest) or if there is no reciprocity.

Such an implementation enables the user to immediately know the other users, within the virtual world, possessing identical or similar characteristics and plays a part in making the immersion interesting for the user. Naturally, from the user's viewpoint, the greater the degree to which the representations of other users have green geometrical shapes in their respective vicinities, the greater the statistical chances that he or she will be satisfied. Here below, a representation of a first user perfectly corresponding to the characteristics sought by a second user will have a green geometrical shape and is here below called a "winning representation".

The management device could use this information to identify the best of all possible worlds, i.e. the one having the greatest number of green indicators (and, as the case may be, in also taking account of the sets of orange indicators).

Distinct subsets could be taken into account in certain embodiments depending on whether the representations are active (online) or inactive (offline).

2.2 Characteristics Monitored

In this embodiment, different characteristics can be monitored to then activate the transfer of one or more users to other servers, or entities for controlling the servers:

the variation of the population of the virtual environment according to the arrivals and departures of the users. When there is an increase in the population (it exceeds a predetermined threshold), an additional server may be added. When there is a decrease in the population (when this population goes below a predetermined threshold), a server may be eliminated. The computing of the new distribution (i.e. the distribution of the users on the different servers) may rely for example on the characteristics or criteria stated by the users. Such a variation of the population has a direct effect on the load of the server associated with the virtual world that undergoes the variation;

the result of a computation relating to nth population of users. For each user, a computation is made in order to determine the number of winning representations on the server (the virtual world) to which he or she is currently connected and on the other servers (other virtual worlds). If on another server the number of winning representations is significantly greater, the transfer is activated.

If the user is not communicating with another user during the implementation of the method, a proposal is made to him or her to the effect that he/she might go to the server where there is a greater number of winning representations. The transfer to the new virtual world is in this embodiment subordinated to the user's assent.

2.3 Identification of a Virtual Destination World

Here below two examples are presented of implementation of the identification of a virtual destination world relative to the preliminarily presented, monitored characteristics.

2.3.1 Variation of the Population

Figure 4:
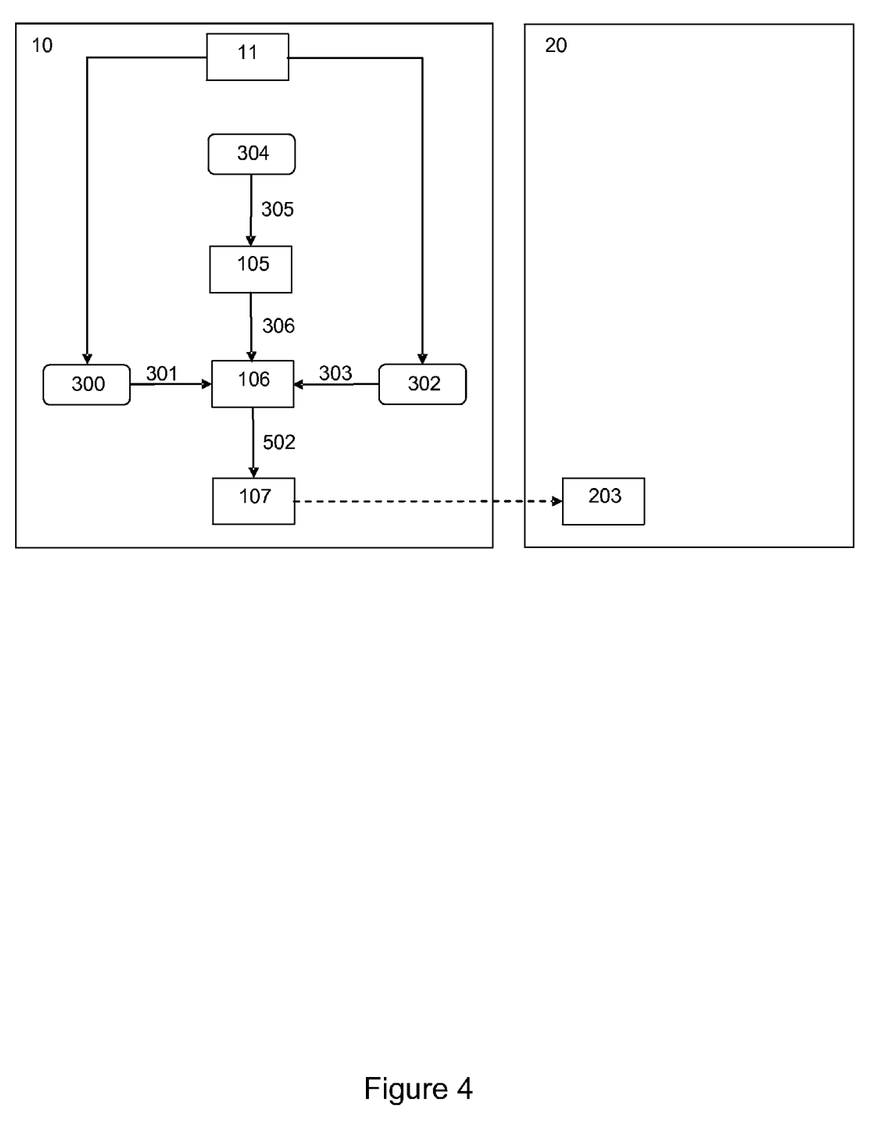
FIG. 4 is a chart of sequences for an activation of the method by a second event.

Referring to FIGS. 1 and 4, we present an embodiment of an identification of a virtual destination world during a variation of the population of the virtual world according to arrivals and departures of the users.

In the real world 10, an immersion device enables the user 11 to make modifications, in a container 300 (using a dedicated application for example), of his or her characteristics 301 known as "possessed" characteristics and to make modifications, in a container 302, of the characteristics 303 known as "sought" characteristics among the users that he wishes to meet.

The container 300, for example a file or a database, stores the characteristics possessed 301 by each user in the real world (for example eye color, height, favorite sports etc).

The container 302, for example a file or a database, stores the characteristics sought 303 by each user from the real world (for example eye color, height, favorite sports etc).

The container 304, for example a file or a database, stores a piece of identification information of the server 305 of each user (i.e. the real world in which the representation of the user is located).

The identification then comprises:

a step 105 for computing the load on all the servers (or entities). If a server reaches the parameterized maximum load threshold (and if no other server has any availability), a new server is activated. If a server reaches the parameterized minimum load threshold, it is considered to be deactivated in the computation of the new distribution. A command 306 for launching a computation of a new optimum distribution for the servers is transmitted;

a step 106 for computing possibilities of encounters on active servers for each user representation present on the overloaded server, on the basis of possessed characteristics 301 coming from the container 300 and sought characteristics 303 coming from the container 302. The best distribution 502 providing the maximum possibilities of encounters to each user is obtained for example by computing a decision tree segmented by the characteristics of the users;

a transfer step 107 (or transfer proposal step) for transferring selected user representations 203 to their new servers, using the new distribution 502 to be instantiated.

2.3.2 Computation with the Flow

Figure 3:
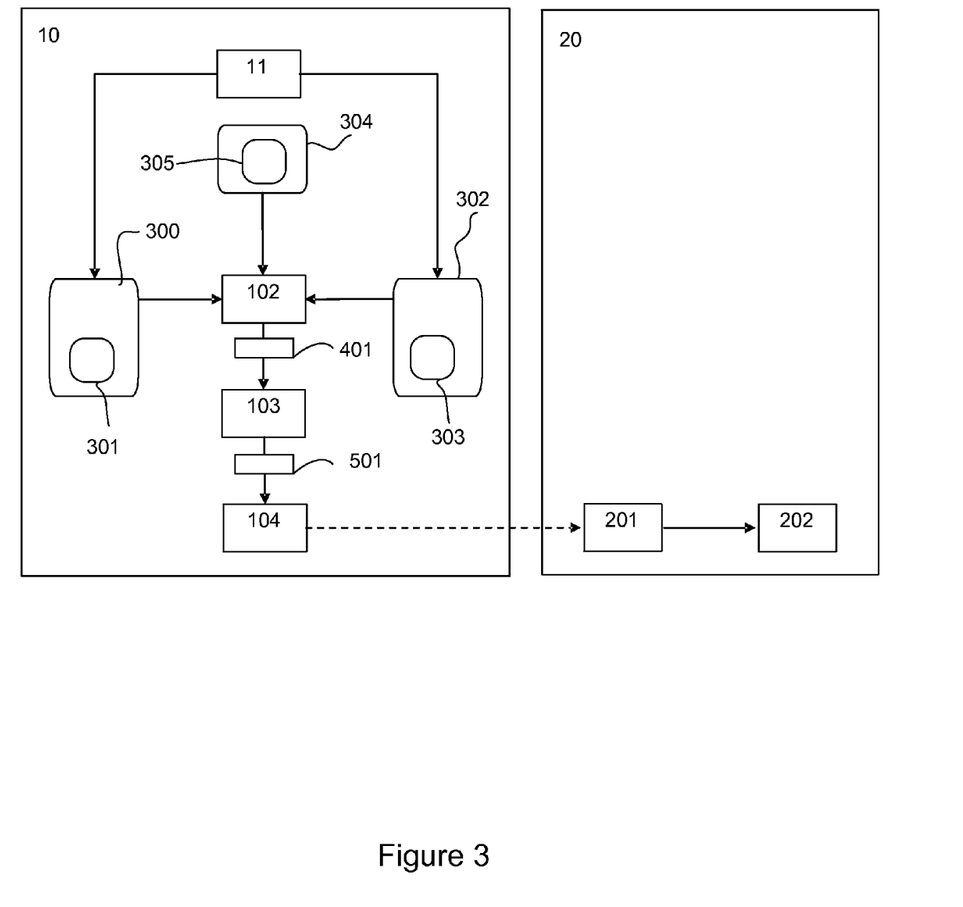
FIG. 3 is a chart of sequences for an activation of the method by a first event.

Referring to FIGS. 1 and 3, we present an embodiment of an identification of a virtual destination world during a continuous updating of the population, which therefore corresponds to an "underwater" computation (i.e. a computation without action by users), done along with the flow (i.e. constantly).

In the real world 10, an immersion terminal enables the user 11 to modify in a container 300 (for example by means of a dedicated application) his characteristics 301 known as "possessed" characteristics (i.e. his own characteristics) and, in a container 302; the characteristics 303 known as characteristics sought in the users that he wishes to detect.

The container 300, for example a file or a database, memorizes the characteristics possessed 301 by each user in the real world (for example eye color, height, favorite sports etc).

The container 302, for example a file or a database, stores the characteristics sought 303 by each user of the real world (for example eye color, height, favorite sports etc).

A container 304, for example a file or a database, stores a piece of identification information of the server 305 of each user (i.e. the virtual world in which the representation of the user is located).

The identification then comprises:
a computation step 102 for computing (for example in the form of a mathematical distance) the chances of success of an encounter 401 on all the servers for each user representation present, on the basis of the possessed characteristics 301 coming from the container 300 and the sought characteristics 303 coming from the container 302 and does so for the server 305 of the user and for all the other active servers (not shown);
a step 103 for comparing the chances of success of an encounter 401 between two users for each user representation. For a user representation, when there are significantly more possibilities on another server then on the server in which he/she is located, the comparison 103 delivers a piece of information 501 representing a destination world with an interface 104 (of the device 11). This can be implemented in the form of a computation of distance between the characteristics of the different users, if necessary with adapted waiting values. The comparison of encounter possibilities can be parameterized either according to a fixed threshold (the new virtual destination world must offer at least 20 additional possibilities) or according to a fixed rate (the new virtual destination world must offer at least 50% of additional possibilities);
a transfer proposal step and/or a transfer step: the representative information 501 sent to the real/virtual interface 104 and an interface 201 (in the virtual world) prompts a graphic display 202 associated with the proposal to participate in the new distribution in the virtual world 20. If the user accepts this proposal, he is transferred to the server in accordance with the new distribution.

2.4 Examples of Distribution

The system for managing preferably does not take account solely of the characteristics of each user. It also advantageously tries to take account of the technical aspects (the load of the servers for example) and the values of balance in each world (number of persons, aspects pertaining to diversity and/or the homogeneity of the distributions etc).

Here below, we present three examples of distributions of user representations that can be implemented during the identification of the virtual world of destination of a representation of a user.

2.4.1 Event-related Smoothing of the Load

The pure management of load is a first variant of computation of a novel distribution of user representations. The fact that the value of the load goes beyond a determined ceiling or below a determined threshold therefore constitutes an event triggering the distribution.

This first example is based first of all on the management of the load inherent in a given virtual world (hence of the load of the server or of the control entity on a server hosting this world). In this example of distribution, as soon as a virtual world approaches a predefined load ceiling (for example 90%), this virtual world is duplicated (i.e. a copy thereof is created) according to an algorithm of duplication which distributes the representations in taking account of a gender logic which it imposes on itself (for example a homogenous distribution of men and women) and by seeking a distribution that provides each user with a maximum number of representations that correspond to his or her characteristics (i.e. a maximum number of distinctive green signs in the example described here above).

This algorithm is implemented only in the "parent" world and therefore does not take the other virtual worlds in operation into consideration. The new distribution of the user representations is therefore related solely to the representations contained in the parent world. The algorithm for computing correspondences of characteristics brings consistency to the search elements: sex, age, town (the sex and the town are processed beforehand at the time of the connection to the service, i.e. these data items are already processed during the initial allocation of the user representation when he or she comes online).

A similar mode of operation is implemented when the load of two worlds passes beneath a determined threshold. In this case, these two worlds merge together. Thus, when a load reaches a determined threshold, in two virtual worlds considered (as soon as two worlds have an occupancy rate of less than 50% for example and when the addition of the loads of the two worlds gives an occupancy rate below 75% for example), then these two worlds are merged.

2.4.2 Continuous Smoothing of the Load

In this second variant, a continuous smoothing of the load is achieved, by carrying out an identification of a virtual destination world for each user representation along with the flow, i.e. user by user. In other words, the event that prompts a search for and identification of a virtual destination world is an instant of a start of implementation of the search.

A computation invisible to the user is done periodically to identify the best a priori situation of the representation of this user relative to all the virtual worlds available (i.e. relative to all the duplications of a same original virtual world).

In this example of distribution, according to an embodiment of the invention, a computation time (i.e. a "processor" time) is assigned as a given priority to the user representations having the lowest ratio "r" as follows:

$$r = \frac{\text{number of winning representations}}{\text{total number of representations}}$$

Each world in activity comprising active user representations will be successively subjected to a computation in order to identify the best virtual world of connected and online representations into which the user representation can be transferred, i.e. in which the number of winning representations relative to the user is the maximum.

Apart from the value of the ratio "r", the assigning of a computation time to identify a new destination world can also be undertaken if the threshold of winning representations is crossed (for example below 30).

The assigning of a computation time according to an embodiment of the invention is done so as not to induce any slowing down in the implementation of the virtual world while at the same time satisfying users.

When the destination world has been identified, the user's assent is requested prior to his transfer.

In other words, in this variant of a computation of a distribution:
as soon as a virtual world is constituted, a list of all the users connected to this world is drawn up. A sorting-out operation is regularly performed to identify the users who possess the fewest "winning representations" in this world;

as soon as a user is below a threshold "s" (for example with fewer than 30 winning representations proposed), the search for a destination world starts (for example by sequentially interrogating all the other virtual worlds available in order to know the number of potential winning representations for this user). If this search gives a possibility higher than the number of winning representations proposed in the user's current virtual world, then an indication can be given to him and a function can be activated in order to inform him of the possibility of a transfer;

if the client activates a transfer, he is transferred into the virtual destination world.

2.4.3 Online/offline Smoothing

In this third variant of computation of a new load-smoothing distribution, the activities of the user representations are taken into account.

Indeed, in order to make the immersion in a virtual world pleasant, there should always be a minimum number of tangible actions (i.e. actions that give rise to interactions).

To respond to this dynamic process, an embodiment of the invention introduces a mode of insertion of offline user representations into the virtual world so that, in the virtual world, a user can meet user representations who are offline.

Indeed, users who are registered with services accessible in the virtual worlds but are offline (i.e. they are not interacting in the virtual world) are nevertheless integrated into the dynamics of the virtual world.

Such integration, inasmuch as the users do not act on their representations, does not entail any notable increase in load. Thus, it is possible to integrate a large number of representations of offline users while at the same time keeping the display of the winning representations (even in these representations of offline users).

Thus, the load of the servers implementing the virtual world is smoothened because:

a concordance between a maximum number of online user representations and offline user representations is made so as to maintain an overall good impression of the population of the virtual world on the part of the users. This makes it possible, at the level of the server, to maintain the resources available for the online users;

the number of offline user representations is diminished as and when other users get connected to the virtual world. As an alternative, according to an embodiment of the invention, rather than being eliminated from the virtual world, these representations of offline users may be transferred to another virtual world so that a homogenous population density is maintained throughout the virtual worlds and therefore a homogenous load throughout the servers.

the representations of the offline users are processed more speedily within the virtual world.

3. Structure of a Device for Managing a Set of Entities for Controlling Virtual Worlds Finally, referring to FIG. 5, we present the simplified structure of a device for managing a set of entities, each controlling a virtual world, implementing the method for managing according to the particular embodiment described here above.

Figure 5:
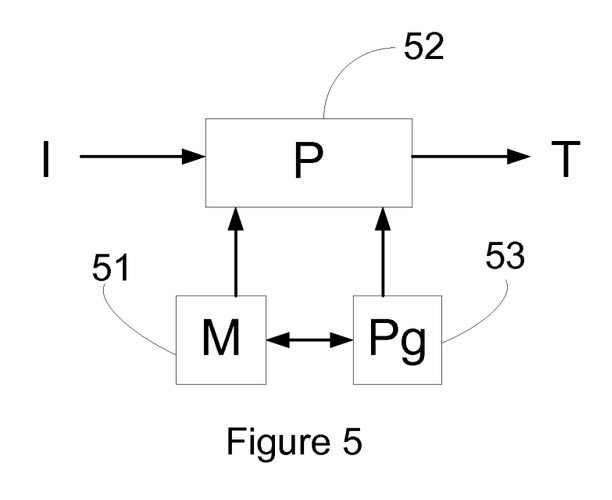
FIG. 5 presents the structure of a transfer device implementing the transfer method according to one particular embodiment of the invention.

A collecting apparatus such as this comprises a memory 51 constituted by a buffer memory, a processing unit 52 equipped for example with a microprocessor µP and driven by the computer program 53 implementing the method for managing according to an embodiment of the invention.

At initialization, the code instructions of the computer program 53 are loaded for example into a RAM and then executed by the processor of the processing unit 52. At input, the processing unit 52 receives aqt least one characteristic of each of said entities and/or at least one characteristic of the corresponding virtual world. The microprocessor of the processing unit 53 implements the steps of the method for managing described here above according to the instructions of the computer program 53 to decide whether a transfer of a user's representation can be proposed. To this end, the device for managing comprises, in addition to the buffer memory 51, means for monitoring at least one characteristic of each said entities and/or at least one characteristic of the corresponding virtual world and means for proposing to transfer and/or for transferring at least one of said user representations from a first virtual world to a second virtual world, according to said monitored characteristic or characteristics. These means are driven by the microprocessor of the processor unit 52.

Such a device is, in particular, a centralized server managing the different servers and control entities of the servers in a system comprising a plurality of virtual worlds.

Although the present disclosure has been described with reference to one or more examples, workers skilled in the art will recognize that changes may be made in form and detail without departing from the scope of the disclosure and/or the appended claims.

The invention claimed is:

1. A computer implemented method for managing a set of entities, each controlling a virtual environment of a plurality of virtual environments in which user representations are acting, wherein the computer is programmed to perform the steps of the method, and wherein the method comprises the following steps:

monitoring at least one of:
  at least one characteristic of each of said entities; or
  at least one characteristic of said corresponding virtual environment, and
  said monitoring step comprises a sub-step of checking distribution of the user representations in each of said plurality of virtual environments according to at least one predetermined distribution parameter, controlling a possibility of transferring said at least one representation of a user from a first virtual environment to a second virtual environment of the plurality of virtual environments, and after controlling the possibility of transferring, performing at least one of proposing to transfer or transferring at least one of said user representations from the first virtual environment to the second virtual environment, according to said at least one monitored characteristic, comprising:

making a proposal to said user to transfer the user's representation from said first virtual environment to said second virtual environment;

processing a response received from said user following said step of making a proposal so as to determine the user's assent to or refusal of a transfer of the user's representation; and in an event of assent by said user, transferring the representation of said user from said first virtual environment to said second virtual environment.

2. The method according to claim 1, wherein controlling comprises the following sub-steps:

detecting existence of a communication engaged between said user representation and at least one other user representation; and authorizing said step of proposing a transfer or transferring if said detection is negative.

3. The method according to claim 1, wherein monitoring comprises the following sub-steps:

obtaining at least one piece of information representing a characteristic of said user, called a piece of user data;

comparing said piece of user data with corresponding data of at least one other user present in each of the virtual environments; and selecting said second virtual environment in which a transfer must be made according to results of said comparison.

4. The method according to claim 3, wherein comparing implements a computation of a distance between said piece of user data to determine, in each of said environments, at least one set of user representations that are proximate, according to said distance, to the representation of the user to be transferred, and wherein selecting selects a virtual environment in which said set or sets determined at the comparison step comprise the largest number of representations.

5. The method according to claim 1, wherein said predetermined distribution parameter belongs to the group consisting of:

a number of user representations per virtual environment;

a parameter representing a predefined distribution in terms of number of representations between at least two groups of users each having at least one similar characteristic; and a parameter for distributing load of at least one entity for managing at least one virtual environment.

6. The method according to claim 1, wherein said at least one monitored characteristic belongs to the group comprising at least:

one piece of information representing consumption of a resource, by said entity, that is above a determined ceiling;

one piece of information representing consumption of a resource, by said entity, that is below a determined threshold;

a number of user representations below a determined threshold in said first virtual environment;

a number of user representations above a determined threshold in said first virtual environment;

a periodically programmed activation moment; and a randomly programmed activation moment.

7. A device for managing a set of entities, each controlling a virtual environment of a plurality of virtual environments in which representations of a user are acting, wherein the device comprises:

a part of a processing unit configured to monitor at least one of:

at least one characteristic of each of said entities; or at least one characteristic of said corresponding virtual environment, and said monitoring step comprises a sub-step of checking distribution of the user representations in each of said plurality of virtual environments according to at least one predetermined distribution parameter, a part of the processing unit configured to control a possibility of transferring said at least one representation of a user from a first virtual environment to a second virtual environment of the plurality of virtual environments; and a part of the processing unit configured to perform, after controlling the possibility of transferring, at least one of proposing to transfer or transferring at least one of said user representations from the first virtual environment to the second virtual environment, according to said at least one monitored characteristic, comprising:

making a proposal to said user to transfer the user's representation from said first virtual environment to said second virtual environment;

processing a response received from said user following said step of making a proposal so as to determine the user's assent to or refusal of a transfer of the user's representation; and in an event of assent by said user, transferring the representation of said user from said first virtual environment to said second virtual environment.

8. A non-transitory computer-readable carrier comprising a computer program product recorded thereon and executable by a processor, the program comprising program code instructions for configuring the processor to execute a method of managing a set of entities, each controlling a virtual environment of a plurality of virtual environments in which user representations are acting, when the instructions are executed by the processor, wherein the instructions comprise:

instructions configured to cause the processor to monitor at least one of:

at least one characteristic of each of said entities; or at least one characteristic of said corresponding virtual environment, and said monitoring step comprises a sub-step of checking distribution of the user representations in each of said plurality of virtual environments according to at least one predetermined distribution parameter, instructions configured to cause the processor to control a possibility of transferring said at least one representation of a user from a first virtual environment to a second virtual environment of the plurality of virtual environments; and instructions configured to cause the processor to perform, after controlling the possibility of transferring, at least one of proposing to transfer or transferring at least one of said user representations from the first virtual environment to the second virtual environment, according to said at least one monitored characteristic, comprising:

making a proposal to said user to transfer the user's representation from said first virtual environment to said second virtual environment;

processing a response received from said user following said step of making a proposal so as to determine the user's assent to or refusal of a transfer of the user's representation; and in an event of assent by said user, transferring the representation of said user from said first virtual environment to said second virtual environment.

* * * * *